(12) United States Patent
Barker et al.

(10) Patent No.: US 8,261,557 B2
(45) Date of Patent: Sep. 11, 2012

(54) HEAT TRANSFER DEVICES BASED ON THERMODYNAMIC CYCLING OF A PHOTONIC CRYSTAL WITH COUPLED RESONANT DEFECT CAVITIES

(75) Inventors: Delmar L. Barker, Tucson, AZ (US); William R. Owens, Tucson, AZ (US)

(73) Assignee: Raytheon Company, Waltham, MA (US)

(*) Notice: Subject to any disclaimer, the term of this patent is extended or adjusted under 35 U.S.C. 154(b) by 937 days.

(21) Appl. No.: 12/328,962

(22) Filed: Dec. 5, 2008

(65) Prior Publication Data

US 2010/0139289 A1 Jun. 10, 2010

(51) Int. Cl.
*F25B 21/00* (2006.01)
(52) U.S. Cl. .............. 62/3.1; 62/3.3; 62/3.6; 62/264; 62/DIG. 1
(58) Field of Classification Search ............. 62/3.1, 62/3.3, 3.6, 3.7, 264, DIG. 1; 165/104.23
See application file for complete search history.

(56) References Cited

U.S. PATENT DOCUMENTS

| | | | |
|---|---|---|---|
| 4,628,695 A * | 12/1986 | Berdahl ............................ | 62/3.1 |
| 6,002,522 A | 12/1999 | Todori et al. | |
| 6,041,610 A * | 3/2000 | Edwards et al. ................. | 62/264 |
| 6,144,679 A | 11/2000 | Herman et al. | |
| 6,430,936 B1 * | 8/2002 | Ghoshal ........................... | 62/3.7 |
| 6,583,350 B1 | 6/2003 | Gee et al. | |
| 6,611,085 B1 | 8/2003 | Gee et al. | |
| 6,618,535 B1 | 9/2003 | Reynolds | |
| 6,684,645 B2 * | 2/2004 | Chu et al. ......................... | 62/3.1 |
| 6,690,023 B2 | 2/2004 | Silivra | |
| 6,694,080 B2 * | 2/2004 | Dejneka et al. ................. | 385/123 |
| 6,744,552 B2 | 6/2004 | Scalora et al. | |
| 6,753,662 B1 | 6/2004 | Krafft | |
| 6,756,594 B2 | 6/2004 | George et al. | |
| 6,859,304 B2 * | 2/2005 | Miller et al. .................. | 359/322 |
| 6,891,869 B2 | 5/2005 | Augusto | |
| 6,893,502 B2 | 5/2005 | Papadimitrakopoulos et al. | |
| 7,078,697 B2 | 7/2006 | Barker et al. | |
| 7,120,338 B2 | 10/2006 | Gunn | |
| 7,282,798 B2 * | 10/2007 | Venkatasubramanian .... | 257/713 |
| 7,292,740 B1 * | 11/2007 | Barker et al. ..................... | 385/7 |
| 7,436,873 B2 * | 10/2008 | Sugitatsu et al. ............... | 372/98 |
| 7,825,366 B2 * | 11/2010 | Barker et al. ............. | 250/227.11 |
| 8,094,023 B1 * | 1/2012 | El-Kady et al. ............ | 340/572.1 |
| 2003/0219052 A1 | 11/2003 | Goodhue et al. | |
| 2004/0013377 A1 | 1/2004 | Han | |

(Continued)

OTHER PUBLICATIONS

"Thermal Radiative Properties of Photonic Crystals" by Masahiro Kibara Department of Biological Functions and Engineering Kyushu Institute of Technology, Jul. 17-22, 2005, 4 pages.*

(Continued)

*Primary Examiner* — Cheryl J Tyler
*Assistant Examiner* — Paolo Gonzalez
(74) *Attorney, Agent, or Firm* — Eric A. Gifford

(57) ABSTRACT

A heat transfer device exploits the properties of photonic crystal solids with resonant defect cavities to execute a thermodynamic cycle to accomplish the conversion between heat flow and useful energy. In a heat pump or refrigerator configuration, an actuator cyclically performs work on the photonic crystal to cycle the photonic crystal between a first state to permit the crystal to collect thermal energy from a cold region to heat the crystal and a second state to permit the photonic crystal to radiate electromagnetic energy to a hot region to cool the photonic crystal. A mechanism cycles the emission band of the photonic crystal for more efficient collection of heat energy and radiation of electromagnetic energy in the cycle.

15 Claims, 12 Drawing Sheets

U.S. PATENT DOCUMENTS

| | | | |
|---|---|---|---|
| 2004/0075464 | A1 | 4/2004 | Samuelson et al. |
| 2004/0113103 | A1 | 6/2004 | Zhilkov |
| 2004/0175087 | A1 | 9/2004 | Soljacic et al. |
| 2005/0057831 | A1* | 3/2005 | Marshall ............... 359/885 |
| 2005/0063451 | A1* | 3/2005 | Abe et al. ............... 374/121 |
| 2005/0121629 | A1 | 6/2005 | Unterrainer et al. |
| 2005/0206020 | A1 | 9/2005 | Baek et al. |
| 2005/0263269 | A1 | 12/2005 | Kaneko et al. |
| 2006/0076518 | A1* | 4/2006 | Barker et al. ............ 250/504 R |
| 2006/0140567 | A1 | 6/2006 | Kittaka et al. |
| 2006/0147213 | A1* | 7/2006 | Rosenwald et al. ........ 398/121 |
| 2006/0257067 | A1* | 11/2006 | Bratkovski et al. ............ 385/12 |
| 2007/0077015 | A1* | 4/2007 | Aoki et al. ............... 385/125 |
| 2007/0147752 | A1 | 6/2007 | Weisberg et al. |
| 2008/0084604 | A1* | 4/2008 | Barker et al. ............... 359/326 |
| 2008/0203849 | A1* | 8/2008 | Hagg ............... 310/306 |
| 2008/0233391 | A1* | 9/2008 | Sterzel et al. ............... 428/339 |
| 2009/0071529 | A1* | 3/2009 | Barker et al. ............... 136/248 |
| 2010/0108916 | A1* | 5/2010 | Barker et al. ............... 250/495.1 |

OTHER PUBLICATIONS

Han et al., Tailoring self-assembled metallic photonic crystals for modified thermal emission, Physical Review Letters, Aug. 3, 2007, The American Physical Society, 053906 pp. 1-4.

Boonyongmaneerat et al., Increasing magentoplasticity in polycrystalline Ni-Mn-Ga by reducing internal constraints through porosity, Phys. Rev. L, Dec. 14, 2007, 247201 pp. 1-4.

Iida, et al.., Enhanced generation of terahertz radiation using 3D photonic crystals with a planar defect, Proc. CLEO/QELS, Jun. 2002 (Baltimore), Section CM1.

Unterrainer et al. et al.; Cavity enhanced few cycle THz generation and coherent spectroscopy, Proc. CLEO/QELS, Jun. 2002 (Baltimore), Section CM1.

Han et al., Terahertz pulse propagation in a plastic photonic crystal fiber, Applied Physics Lett., 80 #15, Apr. 15, 2002, pp. 2634-2636.

Zhi-Yuan Li, Modified thermal radiation in three-dimensional photonic crystals, Phys. Rev. B 66, R241103 (2002), pp. 241103 to 1241103-4.

Lin et al., "Enhancement and suppression of thermal emission by a three-dimensional photonic crystal," Phys. Rev. B 62, R2243 (2000), pp. R2243-R2246.

Md Zain et al., Photonic crystal cavities embedded in photonic wire waveguides, SPIE, vol. 6593, pp. 1-7.

Kang et al., Photonic crystal defect tuning for optimized light-matter interation, SPIE, vol. 7031, pp. 1-7.

Kitzerow et al., Tuning of the optical properties in photonic crystals made of macroporous silicon, Adv. in Optical Technol., vol. 2008, article ID, pp. 1-12.

* cited by examiner

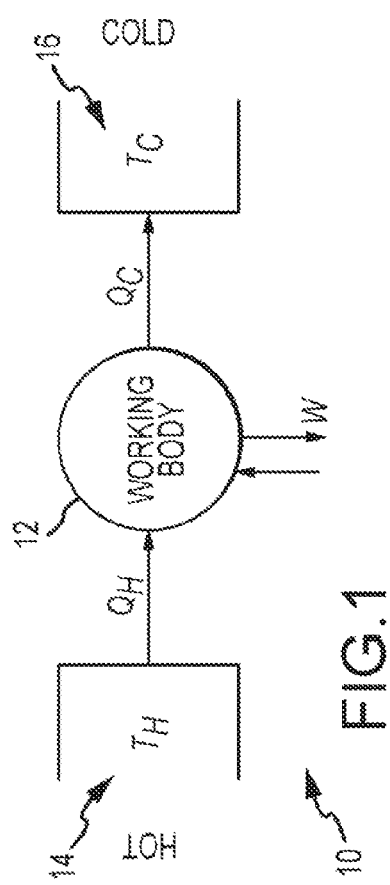
FIG.1
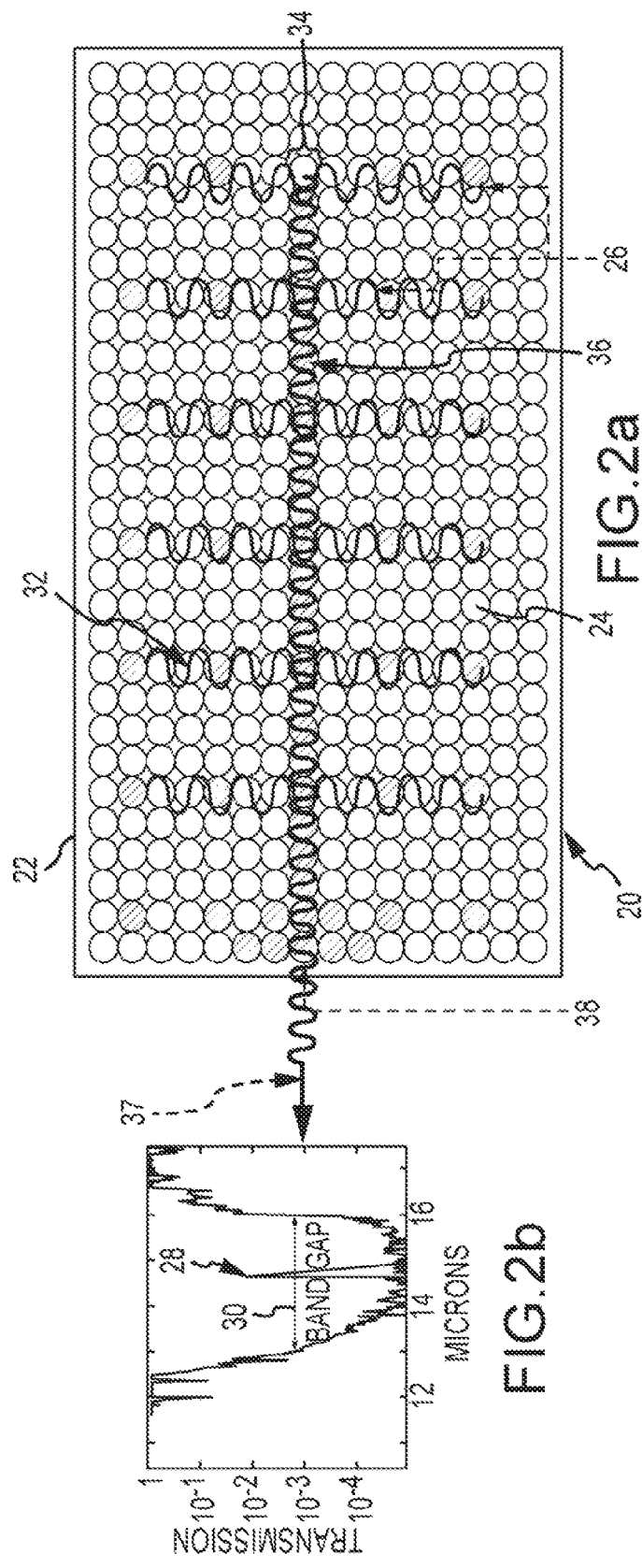
FIG.2a
FIG.2b

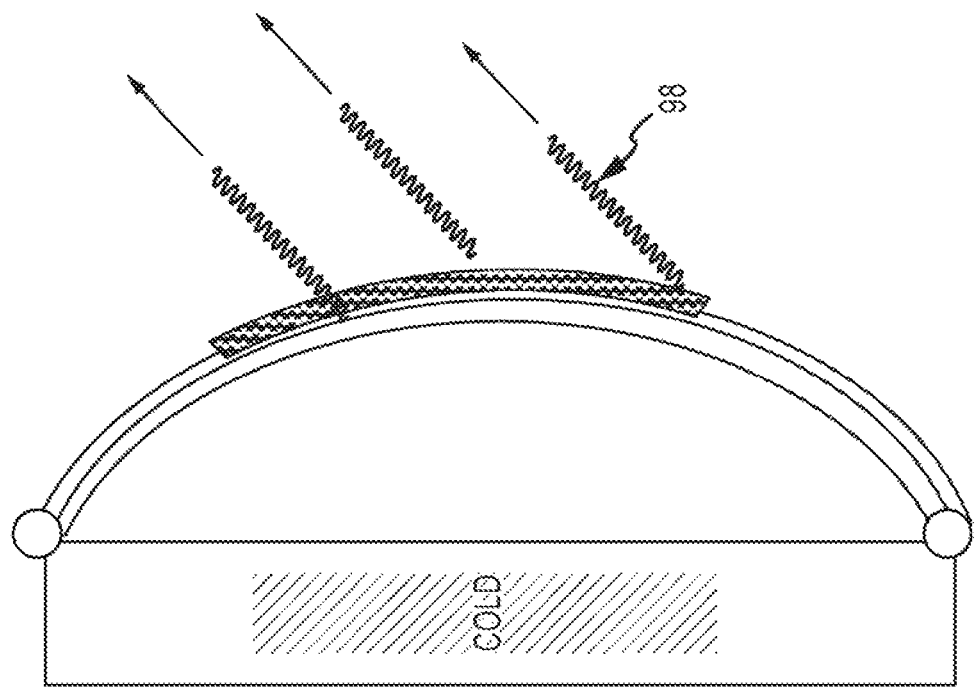
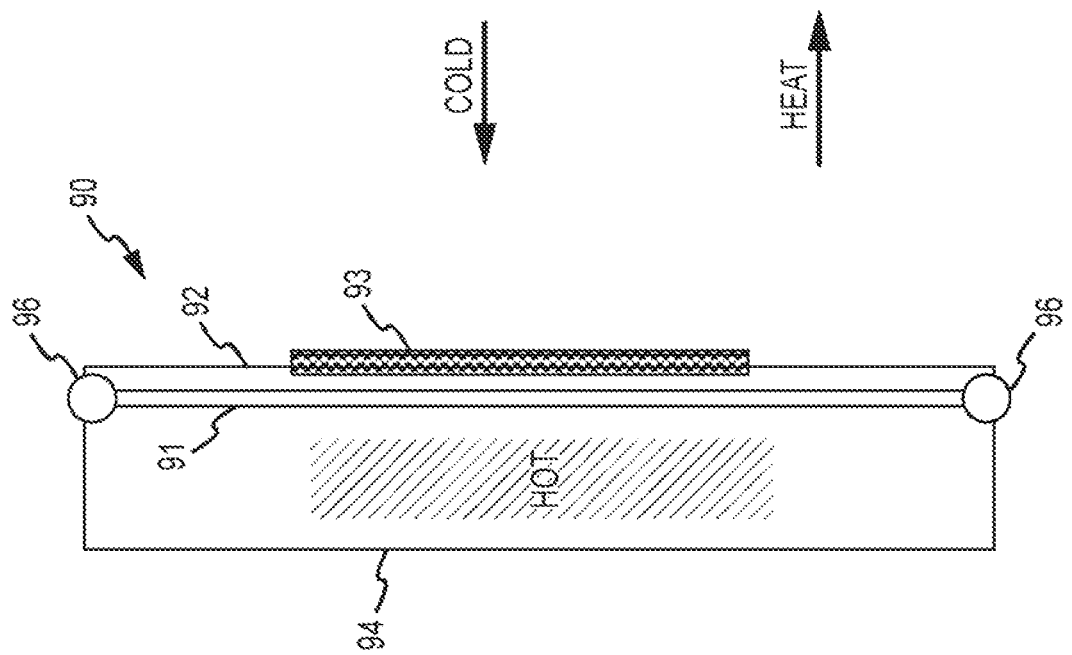

HEAT TRANSFER DEVICES BASED ON THERMODYNAMIC CYCLING OF A PHOTONIC CRYSTAL WITH COUPLED RESONANT DEFECT CAVITIES

BACKGROUND OF THE INVENTION

1. Field of the Invention

This invention relates to heat transfer devices operating as a thermodynamic cycle, and in particular to the thermodynamic cycling of a photonic crystal with coupled resonant defect cavities to implement heat pumps or heat engines.

2. Description of the Related Art

A thermodynamic cycle is a process in which a "working body" (system) undergoes a series of state changes and finally returns to its initial state. The "working body" can be any material ("working fluid") through which heat Q can be introduced or transmitted through to produce work. In the process of going through this cycle, the system may perform work on its surroundings, thereby acting as a heat engine. A heat engine acts by transferring energy from a heat source to a heat sink and, in the process, converting some of that energy to mechanical work. The cycle may also be reversed. The system may be worked upon by an external force, and in the process, it can transfer thermal energy from a heat source to a heat sink thereby acting as a heat pump. Most heat pumps move heat from a low temperature heat source to a higher temperature heat sink. The heat pump may be configured as a refrigerator to maintain a cold set-point temperature or as a heat pump to maintain a warm set-point temperature. Most heat engines and heat pumps exploit compression and expansion of gases or phase changes to transfer the heat along with the material changes.

SUMMARY OF THE INVENTION

The present invention exploits the electromagnetic properties of photonic crystal solids to execute a thermodynamic cycle to accomplish the conversion between heat flow and useful energy in the form of a heat pump or heat engine.

In an embodiment, a heat transfer device comprises a photonic crystal including at least one resonant defect cavity that radiates electromagnetic energy in an emission band. The crystal suitably includes multiple resonant defect cavities having a combined surface area greater than the surface area of the crystal itself to increase radiation. The photonic crystal is thermally coupled to receive thermal energy from a first region. Work means perform work on the photonic crystal to cycle the photonic crystal between a first state to permit the crystal to collect thermal energy from the first region to heat the crystal and a second state to permit the photonic crystal to radiate electromagnetic energy to a second region to cool the photonic crystal. The work means may include means to change the density of states (DOS) in the photonic crystal, which act as the "working fluid", to shift the emission band to collect heat and then radiate electromagnetic energy. The work means may instead or in addition to include means to cycle the heat transfer into the photonic crystal by, for example, physically moving the crystal back-and-forth or through forced convection of a fluid. A cycle that combines cycling of the heat transfer to the crystal and shifting of the emission band to cycle the radiation of electromagnetic energy is the most efficient. The heat transfer device may be configured as a refrigerator to maintain a cold set-point temperature or as a heat pump to maintain a warm set-point temperature. In most applications, the photonic crystal transfers heat from a first cold region to a second hot region. However, the device may be configured to more efficiently transfer heat from a first hot region to a second cold region.

In another embodiment, a heat transfer device configured as a heat engine comprises a photonic crystal including at least one resonant defect cavity that radiates electromagnetic energy in an emission band. The crystal suitably includes multiple resonant defect cavities having a combined surface area greater than the surface area of the crystal itself to increase radiation. The emission band is positioned so that the photonic crystal cycles between a first state to permit the crystal to collect thermal energy from a hot region to heat the crystal and a second state to permit the photonic crystal to radiate electromagnetic energy to a cold region to cool the crystal. This cycling transfers heat from the hot region to the cold region. The work means extract mechanical work from this heat transfer. The work means may include means directly responsive to the expansion and contraction of the photonic crystal as it cycles between heating and cooling, means directly responsive to the cyclic temperature change of the photonic crystal or means responsive to the cyclic electromagnetic radiation emitted by the crystal. The heat engine may operate off of 'waste heat' generated by the inherent radiation of the photonic crystal in its environment. Alternately, energy may be input into the system to enhance the thermal transfer and increase the extracted work.

These and other features and advantages of the invention will be apparent to those skilled in the art from the following detailed description of preferred embodiments, taken together with the accompanying drawings, in which:

BRIEF DESCRIPTION OF THE DRAWINGS

FIG. 1 is a diagram of a heat transfer device in which the working body is a photonic crystal and the density of states (DOS) of the crystal serves as the working fluid;

FIGS. 2a and 2b are embodiments of a photonic crystal with coupled resonant defect cavities and the emission band exhibited by the defect cavities, respectively;

FIGS. 5a and 5b are diagrams of a bimetallic strip that provides the work means to both cycle the position and emission band of the crystal to execute the thermodynamic cycle;

DETAILED DESCRIPTION OF THE INVENTION

Figure 3:
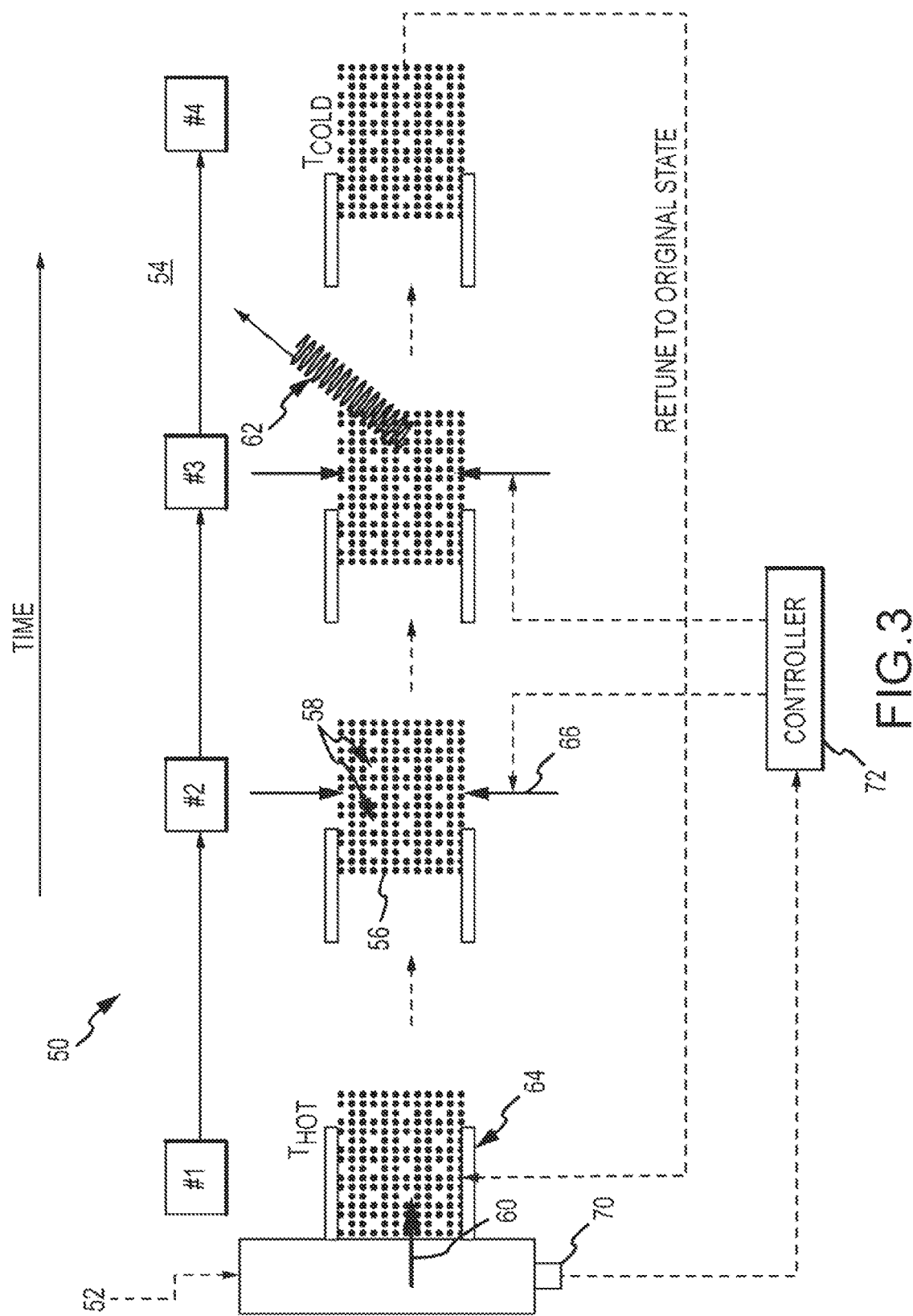
FIG. 3 is a diagram illustrating the execution of a thermodynamic cycle using a photonic crystal as a heat pump.

The present invention describes heat transfer devices that exploit the properties of photonic crystal solids to execute a thermodynamic cycle to accomplish the conversion between heat flow and useful energy in the form of a heat engine or heat pump.

As shown in FIG. 1, a heat transfer device 10 includes a working body 12 that transfers energy from a hot region (heat source) 14 to a cold region (heat sink) 16 or vice-versa. Working body 12 comprises a photonic crystal including at least one and preferably multiple resonant defect cavities that radiate electromagnetic energy in an emission band within the crystal's photonic band gap (PBG). The density of states (DOS) in the photonic crystal are analogous to the "working fluid". $T_H$ and $T_C$ are the temperature of the hot and cold regions, respectively. $Q_H$ is the heat energy leaving the hot region and entering the photonic crystal and $Q_C$ is the heat energy leaving the photonic crystal and entering the cold region. In a heat pump or refrigerator configuration, work W is performed on the crystal to effectuate heat transfer from the cold region to the hot region. This work W may be macroscopic mechanical work or microscopic work that affects properties of the crystal. In a heat engine configuration, mechanical work W is extracted from the heat transfer from the hot region to the cold region.

Waves in a photonic crystal have specific wavelengths and can propagate in specific directions, and each wave occupies a different mode, or state. Not all wavelengths are permitted in a photonic crystal, and at some wavelengths, many closely spaced wavelengths are permitted. Because many of the permitted states have the nearly same wavelength, and therefore share the same energy, there may be many states available at certain wave lengths, while no states are available at other wavelengths. The density of permitted wavelengths around a specific wavelength is referred to as the density of states (DOS). It can range from zero to very high values as the geometry or other parameters of the photonic crystal are varied. Manipulating the parameters of the photonic crystal shifts the density of states within the crystal. We exploit this shifting of the density of states to permit enhanced radiation from the crystal at certain wavelengths.

In a heat pump or refrigerator configuration, work means perform work on the photonic crystal to cycle the photonic crystal between a first state to permit the crystal to collect thermal energy from a first region (typically the cold region) to heat the crystal and a second state to permit the photonic crystal to radiate electromagnetic energy to a second region (typically the hot region) to cool the photonic crystal. A refrigerator cools the cold region, typically maintaining it at a desired cold set-point temperature. A heat pump warms the hot region, typically maintaining it at a desired warm set-point temperature. The efficient collection of thermal energy and radiation of electromagnetic energy in the cycle is accomplished by cycling the emission band and/or the heat transfer into the photonic crystal.

In a heat engine configuration, the emission band is positioned so that the photonic crystal cycles between a first state to permit the crystal to collect thermal energy from the hot region to heat the crystal and a second state to permit the photonic crystal to radiate electromagnetic energy to the cold region to cool the crystal. This cycling transfers heat from the hot region to the cold region. The work means extracts mechanical work from this heat transfer.

A photonic crystal contains a periodic high-contrast modulation of the local index of refraction (or dielectric constant, for non-magnetic materials) in one, two or three dimensions (see for example J. D. Joannoppulos, R. D. Meade, and J. N. Winn, "Photonic Crystals: Molding the Flow of Light," Princeton: Princeton University Press (1995), or C. Lopéz, "Materials Aspects of Photonic Crystals," Advanced Materials 15, 1679 (2003)). Any two substances having sufficient contrast between their respective indices of refraction can be placed in a stable periodic arrangement with a particular geometry, spacing and shapes of the constituent substances to create a photonic crystal for a particular range of photon wavelengths. The photonic crystal may comprise materials, for example, silicon and air, but the photonic crystal may also comprise other materials, for example, SiN, $SiO_2$, plastics, metals, ceramics, composites, and many other materials, whether solid, liquid, or gas. Radiation propagating in such a structure will undergo multiple Bragg scattering from the lattice array and multiple scattering off the individual scattering elements. Under certain conditions, the multiply-scattered waves interfere destructively, resulting in minimal transmission over a broad range of wavelengths, which is termed the "photonic band gap" (a term borrowed from semiconductor physics). The photonic band gap is said to be complete when transmission is blocked for all angles of incidence and all polarization states within the wavelength band. The center wavelength of the band gap can be selected by controlling the parameters of the photonic crystal including its lattice constants, symmetry of the individual scattering elements or of the unit cells formed from scattering elements, and the refractive index contrast.

Resonant defect cavities in the periodic arrangement, which disturb the periodic structure of the crystal, exhibit an emission band within the photonic band gap that accepts and transmits electromagnetic energy. In general, defect cavities may comprise an absence of material where material would be present, the presence of material where material would not otherwise be present, a different type of material, a different geometry of material or a void. The defect cavities are configured such that a narrow band of wavelengths within the photonic band gap, as described earlier, encounters constructive interference when it enters a cavity, thus resulting in little loss within the cavity, i.e., the cavity may comprise a high Q factor. The cavity may be configured such that the wavelength of the local peak radiation in the emission band encounters constructive interference within the cavity and may be leaked to other cavities.

The crystal's PBG and the resonant defect cavities' emission band can be shifted in wavelength by varying the DOS. The maximum radiance or "peak" of the emission band occurs at the peak of the Planck spectrum for an object in thermal equilibrium with the photonic crystal. This peak shifts with changes in temperature. As used herein, reference made to the "Planck emission" or "Planck peak" in conjunction with the photonic crystal means the Planck spectrum for an object in thermal equilibrium with the photonic crystal. The crystal's PBG and cavities' emission band (ignoring small shifts caused by expansion and contraction of the crystal due to temperature changes) may be shifted away from the peak to reduce the emission of the crystal to improve collection efficiency or towards the peak to increase the emission to improve radiation efficiency. The PBG and emission band can be shifted by, for example, changing the lattice constants, the symmetry of a photonic crystal scattering element or unit cell of multiple scattering elements or the refractive index contrast. The PBG and emission band may be shifted together or independently. For example, the lattice constants may be varied through expansion and contraction or rotation of the crystal's scattering element. The expansion and contraction may be caused by the cyclic heating and cooling of the crystal as in the heat engine configuration or by the application of work to stretch or compress the crystal as in the heat pump or refrigerator configurations or by construction the crystal from a shape memory alloy (SMA). Work may also be performed to change the symmetry of element or unit cell. A few options for varying the refractive index contrast include formation of the crystal from an electromagnetic materials and application of a changing EM field, formation of the crystal with open cavities and cycling fluids having different refractive indices, formation of the crystal from a photorefractive material and shining light on the crystal and formation of the crystal from a semiconductor material, injecting electron current into the material and cycling fluid in and out of the crystal. In each of these cases, work is performed on the crystal material to effectuate the wavelength shift of the PBG and emission band. The work may be conventional macroscopic work such as stretching/compressing, rotating or altering the photonic crystal or pumping fluids or microscopic work via the application of EM, magnetic or optical fields or current injection.

The motivation for using a photonic crystal is that the formation of multiple defect cavities produces a surface area for radiation that is much larger than the surface area of the photonic crystal. Even though the emission is limited to the narrowband emission band rather than the broad Planck spectrum the total emission is greatly increased, assuming the emission band is placed near the peak.

Waveguide channels within the 2-D or 3-D photonic crystal collect energy from multiple defect cavities and guide the energy to an output. One characteristic of multiple cavities is that they may be configured to resonate with one another by adjusting the size and the distance between the cavities; the size and location of the multiple cavities may be configured such that one cavity may couple its energy with the energy from another proximate cavity. In such an embodiment, one cavity effectively "leaks" electromagnetic radiation to the proximate cavity, and the amount of electromagnetic radiation leaked to the proximate cavity may be dependent on the amount of material between the two cavities. The defect cavities are coupled to defect cavities, which are in turn coupled to other adjacent defect cavities to transport the radiation to the output. Instead of using a waveguide channel, if the defect cavities are in sufficient proximity they will resonate in unison. The radiation can be collected at specified location with mirrors or lenses external to the photonic crystal. An antenna at the location emits the collected radiation.

An embodiment of a photonic crystal 20 for use in the heat transfer device is illustrated in FIGS. 2a and 2b. In this embodiment, photonic crystal 20 includes a medium 22 (e.g. a slab or air) having a first refractive index and a periodic array of cavities 24 (e.g. voids or rods) having a second refractive index different from the first. The geometry of the cavities, the spacing of the cavities, the symmetry of each scattering element (cavity) or of a unit cell (multiple cavities), the lattice constants, the modulation of the refractive indices etc. produce a band gap at a specified center frequency. Defect cavities 26, which disturb the periodic structure of the crystal, exhibit an emission band 28 within the band gap 30 that accepts and transmits electromagnetic energy 32. A waveguide 34 is formed of additional defect cavities 36 that are placed to accept radiation from defect cavities 26, collect the narrowband radiation and guide the enhanced radiation 37 to an output for emission via an antenna 38.

To promote efficient transfer of heat energy from the cold region 16 via the photonic crystal (working body 12) to the hot region 14 as shown in FIG. 1, the photonic crystal executes a thermodynamic cycle (approximation thereto) by cycling the heat transfer into the photonic crystal and/or the emission band 28. Cycling the emission band affects both the collection of heat energy and the radiation of electromagnetic energy. Execution of the thermodynamic cycle drives the crystal to a cold temperature thereby transferring more heat to the crystal and radiating it out faster. Thus, even though a portion of the duty cycle is sacrificed the total radiated energy is large. In the special case of using a thermodynamic cycle to transfer heat from the hot region to the cold region, cycling the crystal is more efficient than the use of a static photonic crystal heat sink that would reach an equilibrium temperature and radiate continuously Except for possibly a short transient, a static photonic crystal in which no work is input to the system could not transfer heat from a cold region to a hot region.

Cycling the emission band shifts the emission band away from the peak of the Planck emission associated with the cold crystal to efficiently collect thermal energy and shifts the emission band towards the peak of the Planck emission associated with the hot crystal to efficiently radiate electromagnetic energy. The emission band may be cycled between two wavelengths, one to collect heat and one to radiate electromagnetic energy, or the emission band may be shifted as the crystal heats up to maintain efficient collection and then shifted as the crystal cools down to maintain efficient electromagnetic radiation. For optimal radiation, the emission band should track the peak of the associated Planck spectrum. For collection, the emission band is positioned away from the peak. A combination of cycling both the heat transfer into the crystal and the emission band is the most efficient. Depending on whether the heat transfer device is configured as a heat pump or heat engine and the specific application, either or both techniques can be employed.

Heat Pump (Heat Pump or Refrigerator)

As shown in FIG. 3, a heat pump 50 executes a thermodynamic cycle to transfer heat energy from a cold region 52 to a hot region 54. The cold region is the heat source and the hot region is the heat sink. Work must be input to the system to transfer heat energy from the cold to hot regions. Heat pump 50 includes a photonic crystal 56 having a plurality of resonant defect cavities 58 that radiate energy in an emission band and work means that perform work on the crystal to cycle the photonic crystal between a first state to permit the crystal to collect thermal energy 60 from the cold region via conduction, radiation or convection to heat the crystal (Thot) and a second state to permit the photonic crystal to radiate electromagnetic energy 62 to the hot region to cool the photonic crystal (Tcold). This 'cycling' effectively transfers heat energy from the cold region to the hot region. The efficient collection and radiation of thermal energy in the cycle is accomplished with work means 64 that cycle the transfer of heat from the heat source into the crystal to collect heat energy and than radiate electromagnetic energy and/or with work means 66 that apply an external field to the crystal to cycle the emission band to collect heat energy and then radiate electromagnetic energy. Cycling of the heat transfer into the crystal may, for example, be accomplished by cycling the position of the photonic crystal back-and-forth with respect to the heat source. Alternately, a fluid can be circulated past the heat source to collect heat and through the photonic crystal to transfer heat to the crystal (see FIG. 12). Fluid may be cycled in and out a photonic crystal to transfer heat and to modulate the refractive index contrast to alternately construct and destruct the photonic crystal properties (see FIGS. 13a-13c). Cycling allows the temperature of the photonic crystal to be driven to greater extremes thereby collecting more heat energy and then more rapidly radiating electromagnetic energy. Consequently, even though a portion of the duty cycle is sacrificed the average radiative effect is greatly enhanced.

Figure 4:
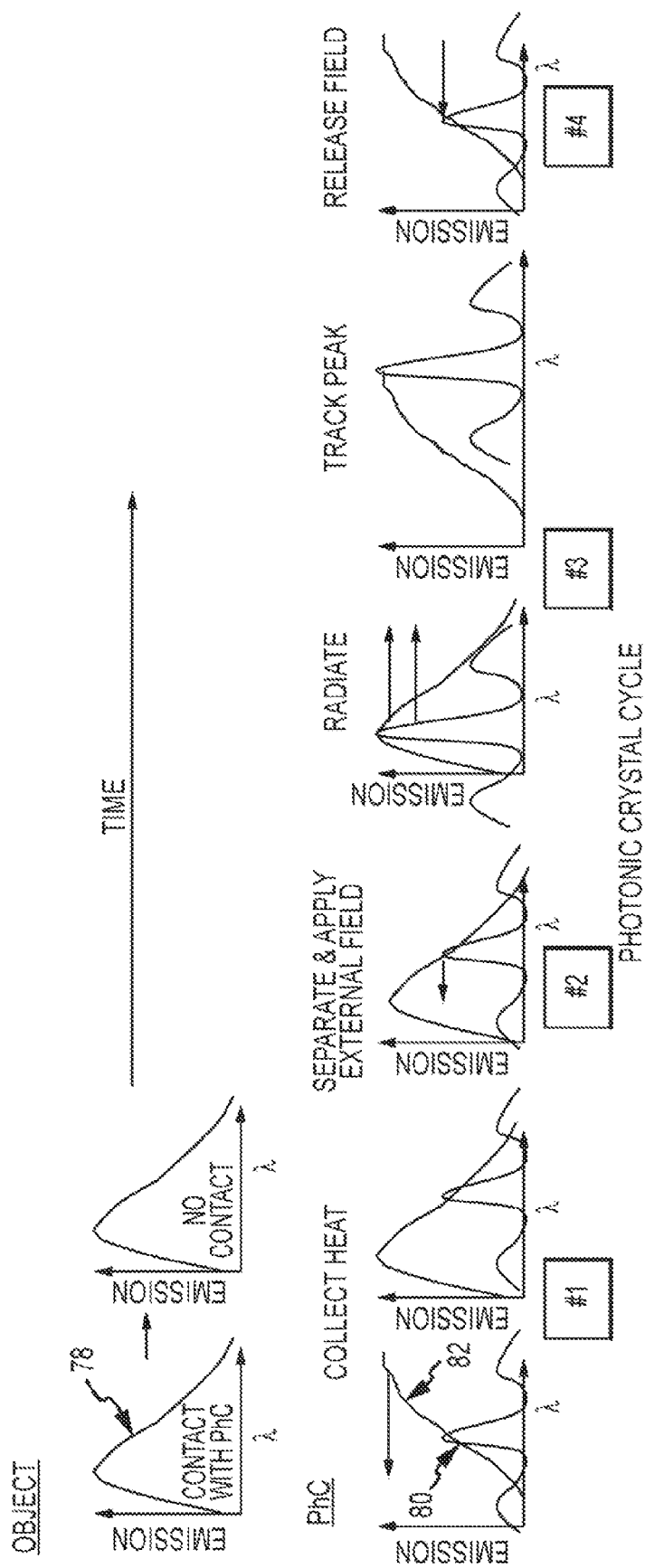
FIG. 4 is a sequence of diagrams illustrating the cycling of both the crystal position and emission band for the efficient collection and radiation of heat shown in FIG. 3.

Although the basic cycle includes a first state for collecting heat energy and a second state for radiating electromagnetic energy to remove heat energy, these states can be more finely parsed to illustrate and describe the movement of the crystal and the shifting of the emission band to execute the thermodynamic cycle. For clarity, the states are parsed into #1, 2, 3 and 4 as shown in FIGS. 3 and 4.

Figure 12:
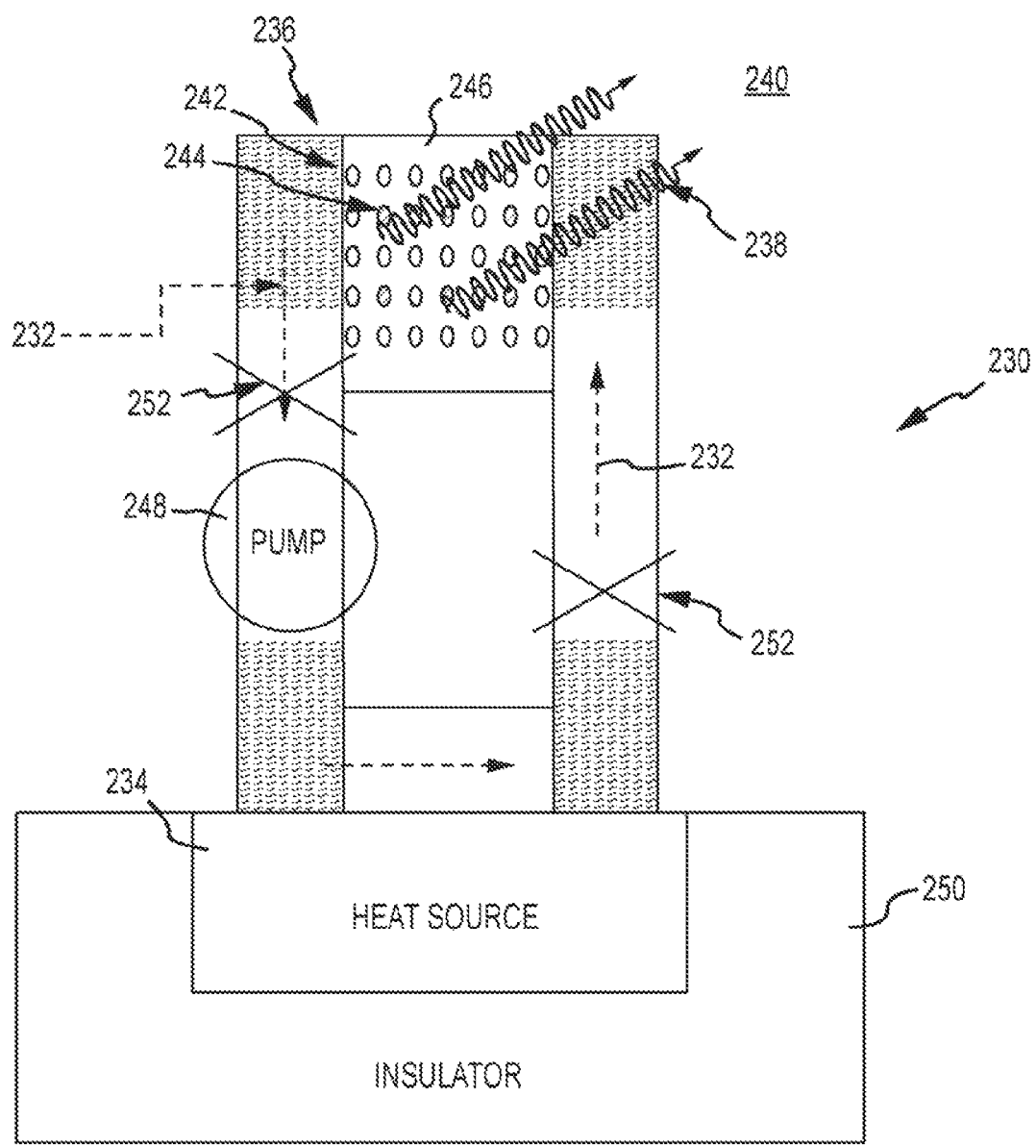
FIG. 12 is a diagram of a forced fluid system for transferring heat from an insulated region to the photonic crystal to cool the region.

As shown in FIG. 3, work means 64 can be any mechanical actuator capable of moving the crystal back-and-forth. For example, the actuator could move the crystal back and forth in response to a control signal. The control signal, for example, could be generated periodically based on a timing sequence, generated based on the temperature of the photonic crystal or generated based on the measured temperature with respect to a set-point temperature of either the cold or hot region depending on whether the heat pump is configured as a heat pump or a refrigerator. Suitable actuators may include but are not limited to piezoelectric, electric, pneumatic, hydraulic, magnetic or optical. Another type of actuator such as formed from a shape memory allow (SMA) or bi-metallic material may be coupled to the heat source and the photonic crystal and respond directly to changes in temperature. For example, if the temperature exceeds a first threshold the actuator changes shape moving the photonic crystal away from the heat source allowing it to radiate electromagnetic energy. When the temperature of the photonic crystal, hence the actuator, drops below a second threshold the actuator returns to its original shape moving the photonic crystal towards the heat source allow it to collect heat energy (See FIGS. 5a-5b). The actuator may be configured to switch between two discrete states as described or to shift along a continuum with temperature. An embodiment of work means that employ forced convection to cycle the heat transfer into the photonic crystal is illustrated in FIG. 12.

Work means 66 can be any mechanism that can apply an 'external field' to the photonic crystal to modify the lattice constants, symmetry properties of the scattering elements or cells or refractive index contrast to tune the resonant defect cavities' emission band. The mechanism suitably tunes the emission band to a first wavelength away from the associated Planck emission peak to collect heat energy from the heat source and tunes the emission band to a second wavelength that coincides with the Planck emission peak to rapidly radiate electromagnetic energy to the heat sink and cool the crystal. The mechanism may either fix the first and/or second wavelengths thereby simply cycling between the two wavelengths or may shift either or both wavelengths to optimize collection and/or radiation. For example, shifting the second wavelength to track the Planck emission peak as the photonic crystal cools improves radiation efficiency. The 'external field' may be electric, magnetic, optical, acoustic, shock, tension, compression, sheer or any field that changes the lattice constants, symmetry or refractive index contrast.

Heat pump 50 may be configured as either a heat pump to warm the hot region 54, typically maintaining it at a desired warm set-point temperature or as a refrigerator to cool the cold region 52, typically maintaining it at a desired cold set-point temperature. Maintenance of set-point temperature is not required but is typical in many applications. Note, the relative temperatures of the hot and cold region are referenced at or near these set-point temperatures. In a refrigerator, if cooling is not provided by the photonic crystal heat pump the temperature of the heat source may actually be higher. Initially the heat pump will reduce the temperature from this elevated temperature until the colder set-point temperature is reached. Similarly, in a heat pump, if heating is not provided by the photonic crystal heat pump the temperature of the sink may actually be lower. Initially the heat pump will raise the temperature until the warmer set-point temperature is reached. In other applications the heat pump or refrigerator may operate open-loop reaching a natural equilibrium dictated by the environment and application.

In a refrigerator configuration, cold region 52 could be, for example, an environment or space that requires cooling or any device such as an electric circuit or sensor that requires cooling. The hot region 54 could be, for example, the ambient atmosphere, Earth's sky, space, etc. The "hot" region is a relative term, in that the colder that region the better it performs as a heat sink for transfer of heat energy from the relatively "cold" region. In other words, it takes less work to remove the heat from the "cold" region and push it into the "hot" region. In a heat pump configuration, hot region 54 could be, for example an environment or space that requires heating or any device that requires heating. The cold region 52 could be, for example, the ambient atmosphere, Earth's sky, space, etc.

In a typical heat pump or refrigerator configuration, a thermocouple would measure the temperature of the object or region that is to be maintained at a specified set-point. For example, in a refrigerator a thermocouple 70 would be coupled to the heat source (cold region 52) and the temperature fed back to a controller 72. The controller compares the measured temperature to the set-point temperature and controls the heat pump (e.g. work means 64 and/or work means 66) accordingly. For example, when the refrigerator is initially turned on the measured temperature may be considerably higher than the set-point temperature. The photonic crystal heat pump will run until the set-point temperature is reached and then turn "off" e.g. shift the emission band away from the Planck peak and/or cut-off heat transfer into the crystal. If the measured temperature increases above the set-point temperature plus some offset, the photonic crystal heat pump is turned back on until the temperature drops to the set-point. If the heat source is generating a lot of heat itself or receiving a lot of heat from the surrounding environment, the photonic crystal heat pump will have to work harder to maintain the set-point. In a heat pump, the thermocouple would be coupled to the heat sink 54 (hot region) and process would operate in a similar manner.

Figure 6:
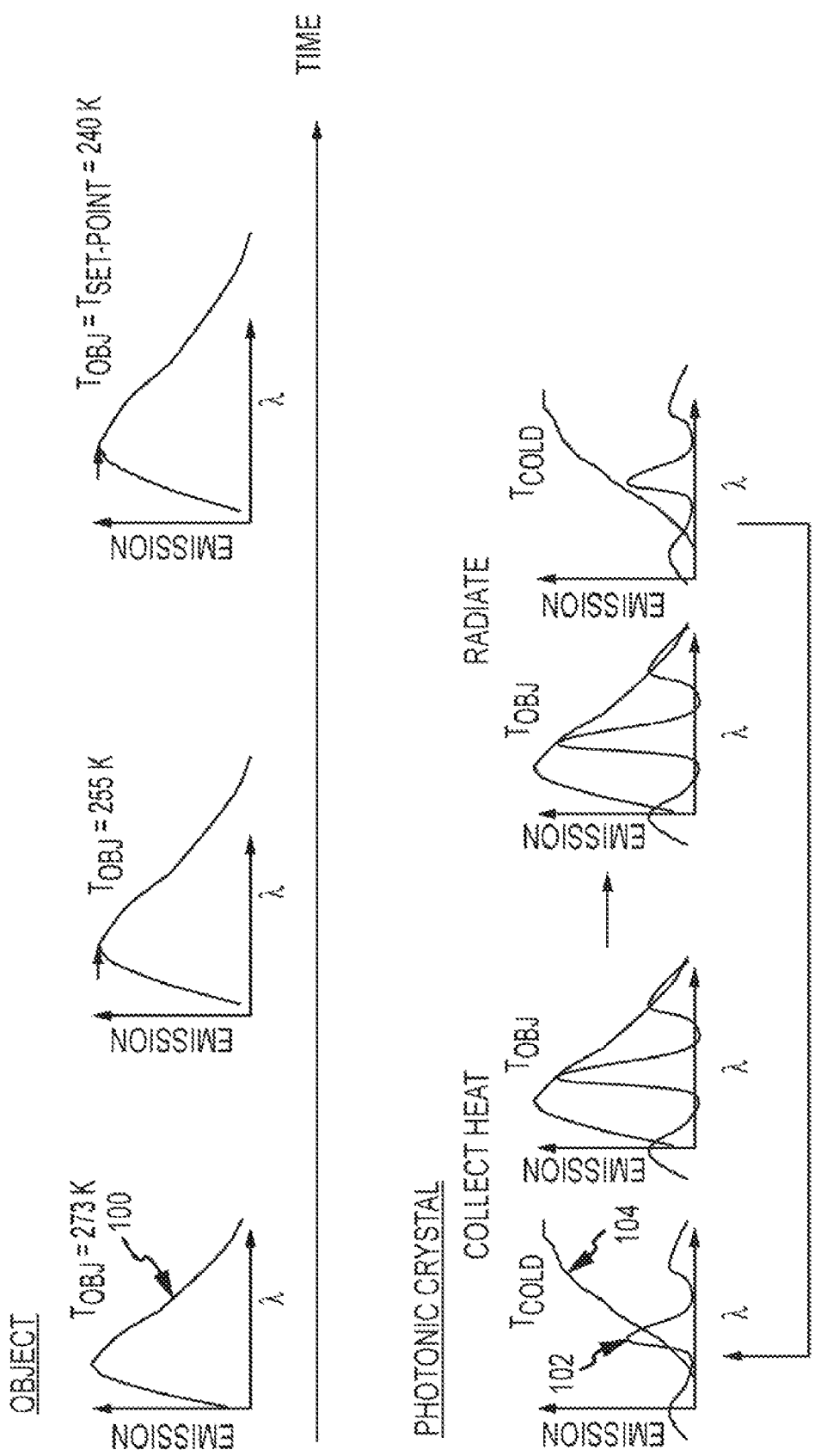
FIG. 6 is a sequence of diagrams illustrating the cycling of the crystal position to execute the thermodynamic cycle
Figure 7:
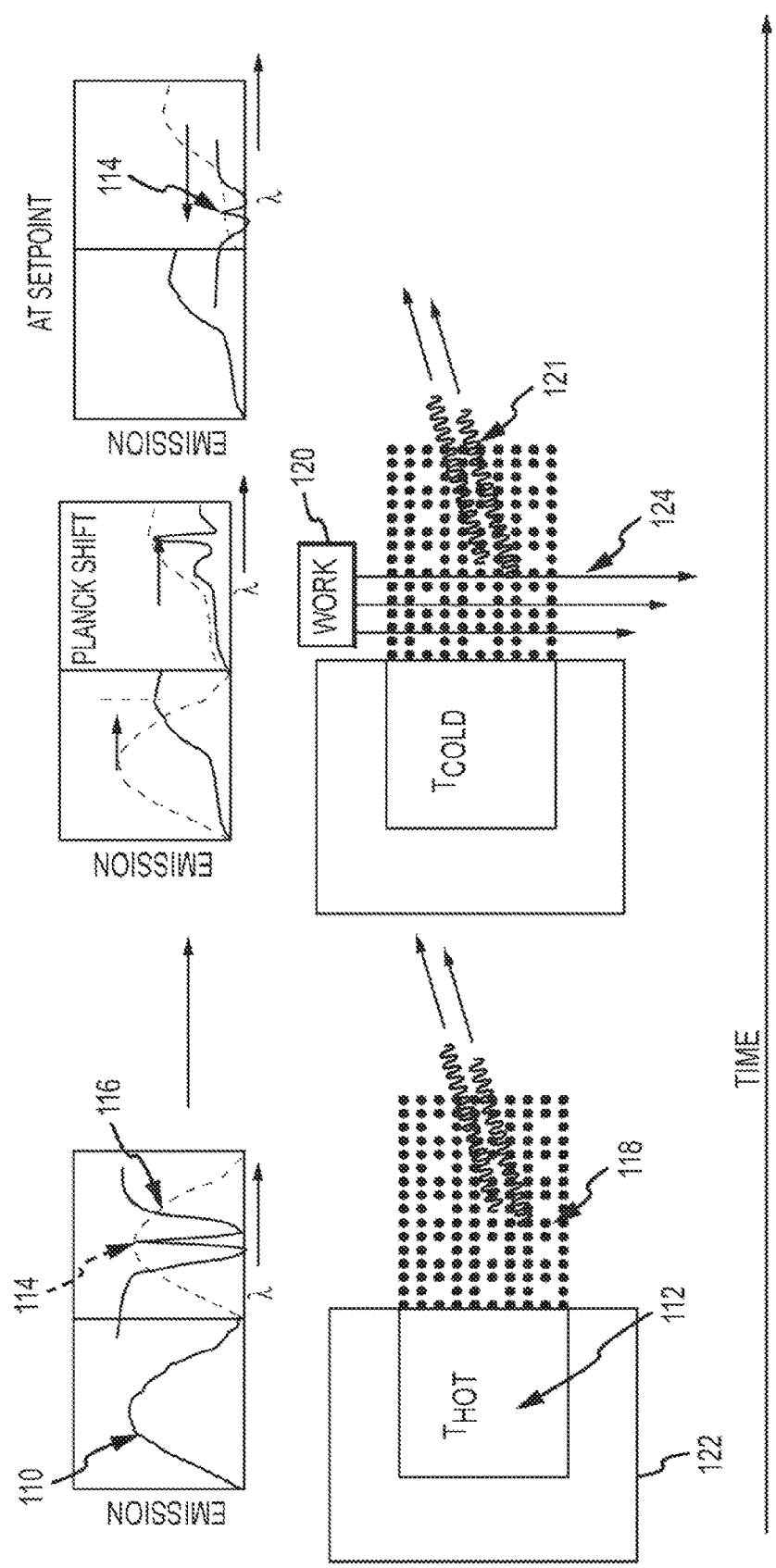
FIG. 7 is a sequence of diagrams illustrating the shift and then cycling of the emission band to cool an object and hold it at a set-point temperature.

As described "cycling" of the photonic crystal to execute a thermodynamic cycle (or approximation thereto) may including cycling the heat transfer into the crystal and/or cycling the emission band back-and-forth between low and high radiance states. For purposes of illustration, cycling of the heat transfer will be accomplished by moving the position of crystal back-and-forth with respect to the heat source. The three different cases are illustrated in FIGS. 4, 6 and 7.

The sequence of diagrams shown in FIG. 4 illustrating the Planck emission 78 of the object and the emission band 80 of the resonant defect cavities superimposed on the Planck emission 82 for an object in thermal equilibrium with the photonic crystal and depict an embodiment that coordinates both the cycling of crystal position and cycling of the emission band. Note, the peak of the Planck emission shifts to the right with colder temperatures. In general, the temperature and thus peak of the Planck emission 78 of the object is fairly stable once the set-point is reached. The temperature of the photonic crystal will range from a high temperature up to the temperature of the object down to a low temperature determined by how efficiently and how long the crystal radiates.

The cycle begins at #1 ("collect heat") where the cold photonic crystal 56 with an emission band 80 shifted away from the cold peak is brought into contact with the heat source. As the photonic crystal collects heat from the heat source its temperature increases and the peak of the Planck emission shifts left. If the crystal is allowed to heat up long enough it will reach approximately the object temperature. In general, the emission band 80 should be positioned so that the radiance is inefficient as the photonic crystal heats up. This can be accomplished by placing the emission band outside the wavelength range between the cold peak and the hot peak of the object. Alternately, the emission band can be shifted as the crystal heats up to keep radiance low. If the heat transfer from the object into the photonic crystal greatly exceeds the radiative capability of the crystal the position of emission band 80 is less important. How long the crystal collects heat may be a period determined by the controller or may be determined by thermocouple attached to the photonic crystal e.g. if Thot of the crystal reaches a threshold temperature or is within a specified % of the object temperature.

Once heat is collected, the cycle shifts to #2 ("Separate & Apply External Field") where work means 64 separates the hot photonic crystal 56 from the heat source either reducing or eliminating heat transfer into the crystal and work means 66 applies or changes the external field to the photonic crystal 56 to shift the emission band 80 to approximately coincide with the peak of the Planck emission 82 (or at least towards the peak).

Once heat is collected, the cycle shifts to #2 ("Separate & Apply External Field") where work means 64 separates the hot photonic crystal 56 from heat source 52 either reducing or eliminating heat transfer into the crystal and work means 66 applies or changes the external field to the photonic crystal 56 to shift the emission band 80 to approximately coincide with the peak of the Planck emission 82 (or at least towards the peak).

Once the crystal has separated and shifted the emission band, the cycle moves to #3 ("Radiate" and "Track Peak") where the crystal rapidly radiates electromagnetic energy in the emission band from the resonant defect cavities. The greater the surface area of the cavities the more rapidly the crystal radiates. As the crystal radiates it will cool shifting the peak of the associated Plank emission to the right. Work means 66 may be controlled to either fix the emission band e.g. at the peak of the Planck emission for the object temperature or at an intermediate point between the peak at the object temperature and the peak at the minimum cold temperature obtained by the photonic crystal, or may shift the emission band to track the peak as the crystal cools. The latter approach may be done with a thermocouple on the crystal that is fed back to the controller or by calculating how fast the crystal will cool and the peak shift and controlling it open-loop. Closed loop control with the thermocouple is typically more accurate but requires the thermocouple. Shifting the emission band to track the peak will maintain a high radiance and thus more rapidly cool the crystal. How long the crystal radiates may be a period determined by the controller or may be determined by a thermocouple attached to the photonic crystal e.g. if Tcold of the crystal reaches a threshold temperature.

Once the collected heat energy has been radiated out of the crystal, the cycle moves to #4 ("Release Field") in which the external field is removed or returned to its original state allowing the emission band to return to its designed wavelength. At this point, the cold photonic crystal is brought back into contact with the heat source and the cycle repeats. The cycle period and sub-periods associated with collect heat, separate and apply externally field, radiate and track peak and release field will be application specific and may vary from cycle-to-cycle depending on the application, the environment and control methodology.

FIGS. 5*a* and 5*b* illustrate an embodiment of a bi-metallic strip 90 including layers 91 and 92 having different coefficients of thermal expansion that serves as both the work means for moving the photonic crystal 93 back-and-forth with respect to the heat source 94 and the work means for shifting the emission band by stretching the crystal thereby changing its symmetry properties. Bi-metallic strip 90 is attached by 'pins' 96 at both ends to heat source 94 and lies in contact and between the heat source and photonic crystal 93 in a first state shown in FIG. 5*a*. As heat is transferred through the strip to heat the photonic crystal the strip will also heat up. When the temperature of the strip exceeds a first threshold the strip changes state and pops out to a second state shown in FIG. 5*b*. This has two effects. First, the photonic crystal 93 has moved away from the heat source eliminating or at least reducing the transfer of heat from the source into the crystal. Second, the outer layer 92 of the bi-metallic strip has stretched, which in turn stretches the photonic crystal 93. This 'stretching' constitutes work that changes the symmetry properties and hence position of the emission band near the peak of the Planck distribution. As the crystal radiates electromagnetic energy 98, the crystal and the bi-metallic strip will cool. When the temperature of the strip drops below a second threshold the strip returns to its original state as shown in FIG. 5*a*. The bi-metallic strip will continue to cycle in this manner. This approach has the benefit of providing a single mechanism that provides both the work means to move the crystal and the work means to shift the emission band. However, because the strip acts as a binary switch the emission band is limited to switching between two wavelengths. Alternately, the bi-metallic strip may be configured to expand and contract along a continuum with changes in temperature thereby shifting the emission band along a continuum.

Similar mechanisms that switch between discrete states as a function of temperature to move the photonic crystal and/or shift its emission band can be formed using a shape memory alloy (SMA). For example, a SMA could be configured to behave similarly to the bi-metallic strip to move the photonic crystal back and forth. Depending on how the crystal is coupled to the SMA it may or may not shift the emission band. Alternately, the photonic crystal may itself be formed from a SMA so that when the SMA changes states it causes the emission band to shift.

A SMA is an alloy that "remembers" its shape, and can be return to that shape after being deformed by applying heat to the alloy. Nitinol (Nickel Titanium Naval Ordnance Laboratory) is an alloy of nearly equal numbers of nickel and titanium atoms, with the exact amounts varied to match the temperature of the phase change to the application. There are others. The alloy can exist in either of two structures (phases) at room temperature, depending on the exact ratio of nickel to titanium atoms. The structure found above the temperature of the phase change possesses the high symmetry of a cube and is called austenite. The structure found below the temperature of the phase change is much less symmetric and is called martensite. In the martensite phase the material is very elastic, while in the austenite phase the material is comparatively rigid.

Nitinol can be "trained" to have a new shape while in the austenite phase by deforming it into the desired shape. As it then cools to below the phase transition temperature, the material enters the martensite phase. In the martensite phase the shape can then be changed by mechanical stress: groups of atoms that were "leaning" in one direction will accommodate the mechanical stress by "leaning" in another direction, as allowed by the less symmetric structure. The sample will revert to the shape enforced upon it while it was in the austenite phase by returning it to the austenite phase through an increase in its temperature. The thermal energy acquired by the shape through heating it provides the energy the atoms need to return to their original positions and the sample to its original shape.

The sequence of diagrams shown in FIG. 6 illustrating the Planck emission 100 of the object and the emission band 102 of the resonant defect cavities superimposed on the associated Planck emission 104 and depict an embodiment in which the position of the crystal is actively cycled but the emission band is not actively cycled. In this case, work means 66 in FIG. 3 are not present. Note the emission band will shift slightly back and forth as the crystal expands and contracts with the temperature cycling. For purposes of illustration we will assume a refrigerator configuration in which the photonic crystal is cycled to reduce the temperature of an object and maintain its temperature near a set-point.

Since the position of the emission band cannot be actively controlled, it must be set at a wavelength that permits the crystal to collect heat energy and to radiate electromagnetic energy. For example, the emission band 102 may be set between the wavelength at the peak of the Planck emission for the initial hot object Tobj on the low end and the wavelength at the peak of the Planck emission at the set-point temperature Tset-point. Let us assume the initial Tobj is 273 K (roughly ambient), Tset-point is 240K, the heat sink is the ambient environment and the photonic crystal can achieve a cold temperature Tcold of 200K.

The cycle begins by moving the photonic crystal in contact with the heat source to "collect heat". Alternately, heat could be transferred via radiation or by forced convection. The temperature of the photonic crystal increases to the object temperature Tobj (provided the crystal is left in contact long enough). The heat transferred into the crystal must be greater than the heat removed from the crystal via electromagnetic radiation in order to collect heat. Otherwise the crystal and object will just reach a static equilibrium point. Once the crystal has collected enough heat energy, which can be determined by a thermocouple coupled to the crystal or by assuming a set period, the crystal is separated from the object to "radiate" and cool the crystal to Tcold. Once the crystal has radiated sufficient electromagnetic energy to remove enough heat energy, which can be determined by a thermocouple coupled to the crystal or by assuming a set period, the crystal is brought back into contact with the object to "collect heat" and heat the crystal to Tobj. This cycle continues as Tobj is reduced from 273K to Tset-point at 240K. Once the set-point is achieved, the crystal is separated from the object. If Tobj increases to greater than Tset-point+offset the cycle is restarted to lower the object temperature to the set-point temperature.

The sequence of diagrams shown in FIG. 7 illustrate the Planck emission 110 of the object 112 and the emission band 114 of the resonant defect cavities superimposed on the Planck emission 116 for an object in thermal equilibrium with photonic crystal 118 and depict an embodiment in which the emission band is actively shifted and cycled by work means 120 to radiate heat energy 121 but the position of the crystal is fixed. In this case, work means to cycle heat transfer into the crystal are not present. For purposes of illustration we will assume a refrigerator configuration in which the object 112 is surrounded by an insulator 122 that limits heat transfer from the environment to a leakage rate. Work means 120 controls the external field 124 applied to the photonic crystal to shift the emission band to first reduce the temperature of the object and then cycle the emission band to maintain its temperature near a set-point.

In this configuration the object temperature Tobj will approximately track the photonic crystal temperature TPhC. To maximize radiation and cooling of the object, work means 120 control the external field 124 so that the peak of emission band 114 preferably tracks the peak of the associated Planck emission 116 associated with the photonic crystal temperature. As the object and crystal cool, the peak of the Planck emission, hence the peak of the emission band will shift to the right. Because the photonic crystal will cool slightly faster than the object, the crystal executes a sequence of very small cycles as the crystal and object cool. Eventually the system will reach an equilibrium temperature at which the leakage rate of heat through the insulation equals the rate of heat removed from the crystal by radiation out of the crystal. In most systems it is desirable to maintain the object temperature at a fixed set-point above the natural equilibrium temperature. To accomplish this, a thermocouple is attached to the object. When the temperature reaches the set-point, the work means control the external field to shift the peak of emission band 114 away from the peak of the Planck emission at the set-point temperature. This has the effect of turning-off additional cooling. If the object temperature rises above the set-point temperature plus a specified offset, the system turns back on and shifts the emission band back to the peak of the Planck emission to radiate energy and cool the object. The duty cycle with which the system is turned on and off will depend on the amount of leakage through the insulation and the size of the offset.

Heat Engine

In a heat engine configuration, the emission band is positioned so that the photonic crystal cycles between a first state to permit the crystal to collect thermal energy from the hot region to heat the crystal and a second state to permit the photonic crystal to radiate electromagnetic energy to the cold region to remove heat energy and cool the crystal. This cycling transfers heat from the hot region to the cold region. The work means extracts mechanical work from this heat transfer. There are two special cases of particular interest. The first is a heat engine that produces work from the 'waste heat' generated by an object. The second is a heat engine that is used to down convert macro work to micro work. In this case there is a separate source of energy or work. This source could supply heat energy to the object or remove heat from the heat sink or could cycle the crystal is previously described. In this case, the heat engine is used to convert the available macro energy or work into a micro form e.g. driving a micro piston. Mechanical work may be extracted directly from the expansion and contraction of the crystal, from the cyclic heating of the crystal or from the cyclic radiation emitted by the crystal. A "piston" is used to illustrate the extraction of work. The "piston" is used as a simple representation for any mechanisms that may be actuated to produce mechanical work.

Figure 8:
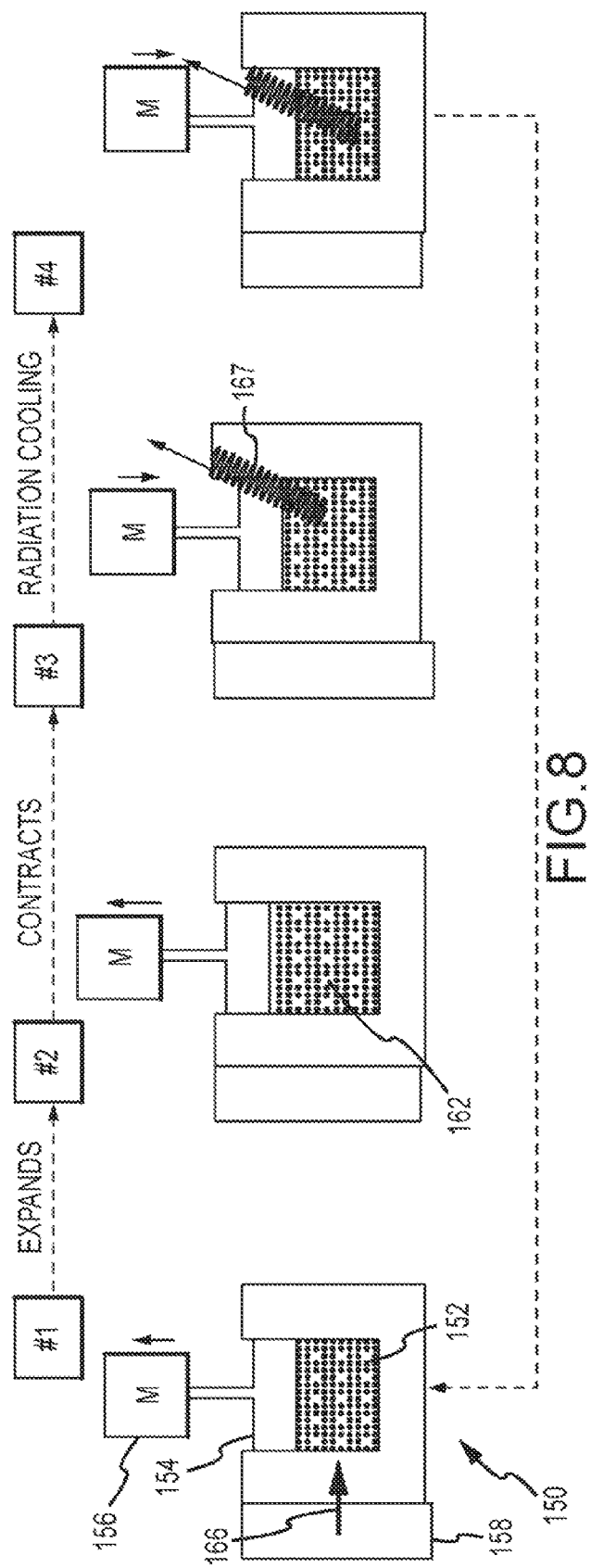
FIG. 8 is a diagram of a heat engine illustrating the extraction of work from the expansion and contraction of a photonic crystal during the thermodynamic cycle.
Figure 9:
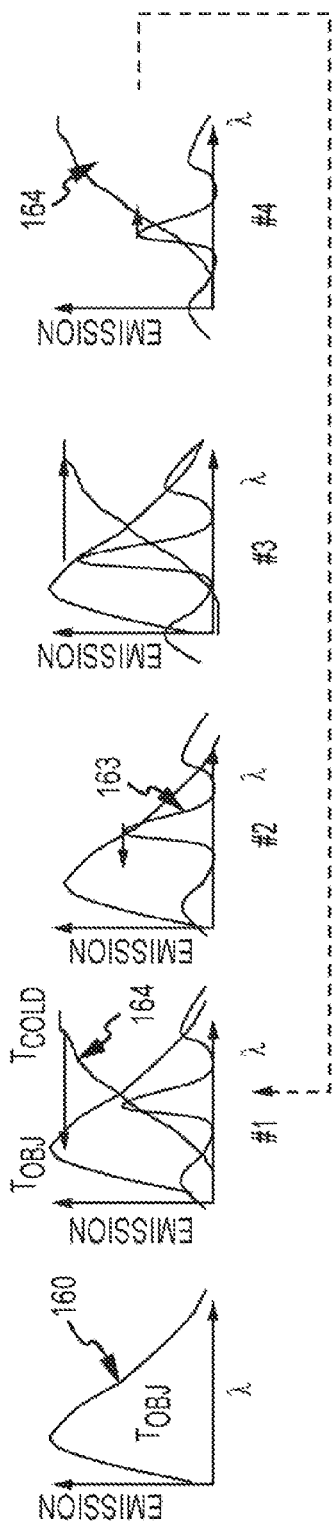
FIG. 9 is a sequence of diagrams illustrating the thermodynamic cycle associated with the extraction of work under waste heat conditions.

As shown in FIGS. 8 and 9, a heat engine 150 is configured to extract work from the expansion and contraction of a photonic crystal 152 via a piston 154 and mass 156 using only the waste heat generated by an object 158. To simplify the illustration, assume that object 158 maintains a constant temperature Tobj with Plank emission 160 to provide the hot region and source of thermal energy. The photonic crystal and defect cavities 162 are designed so that the emission band 163 is positioned between the wavelength corresponding to the peak of the associated Planck emission 160 on the lower end and the wavelength corresponding to the peak of the Planck emission 164 corresponding to the cold temperature Tcold of the photonic crystal. This allows the crystal to alternately collect heat and radiate electromagnetic energy to remove heat.

To start the cycle (#1), assume photonic crystal 152 is at its initial volume and cold temperature Tcold. Heat energy 166 will move from object 158 and be collected by photonic crystal 152. This heats the crystal causing the Planck emission 164 to shift left until it reaches equilibrium with the object temperature Tobj. Heating causes the crystal to expand (#2) thereby moving the piston and mass and producing mechanical work. Heat induced expansion also causes emission band 163 to shift a small amount. The crystal is preferably configured so that the emission band shifts towards the peak of the Planck emission of the object to improve radiative efficiency. After the crystal reaches it maximum expansion it begins to contract (#3) and radiate electromagnetic energy 167 thereby cooling the crystal to Tcold causing contraction back to the original volume (#4). This contraction moves the piston and mass back to their original position and the emission band returns to its original position. The process will continue to cycle to drive the piston and extract mechanical work from only the waste heat produced by object 158. The process may be made more efficient by inserting means such as a bi-metallic strip between the object and the photonic crystal that moves them back-and-forth to collect heat and radiate electromagnetic energy without requiring any additional energy or work not supplied by the waste heat.

To reconfigure this heat engine to convert macro work to micro work, one could input energy or work into the system in one or more ways. First, additional heat energy could be made available at the object. Second, energy could be used to remove heat energy from the cold region or heat sink thereby improving heat transfer, which in turn increases the work that can be extracted. Third, work means could be used to cycle the transfer of heat from the object into the photonic crystal to improve thermal transfer. Fourth, work means could be used to cycle the emission band to improve thermal transfer. In each of these cases, the energy or work input to the system will exceed the extracted mechanical work but will have the effect of converting the energy or work to a desired micro work, which may be useful in a certain micro-applications.

Figure 10:
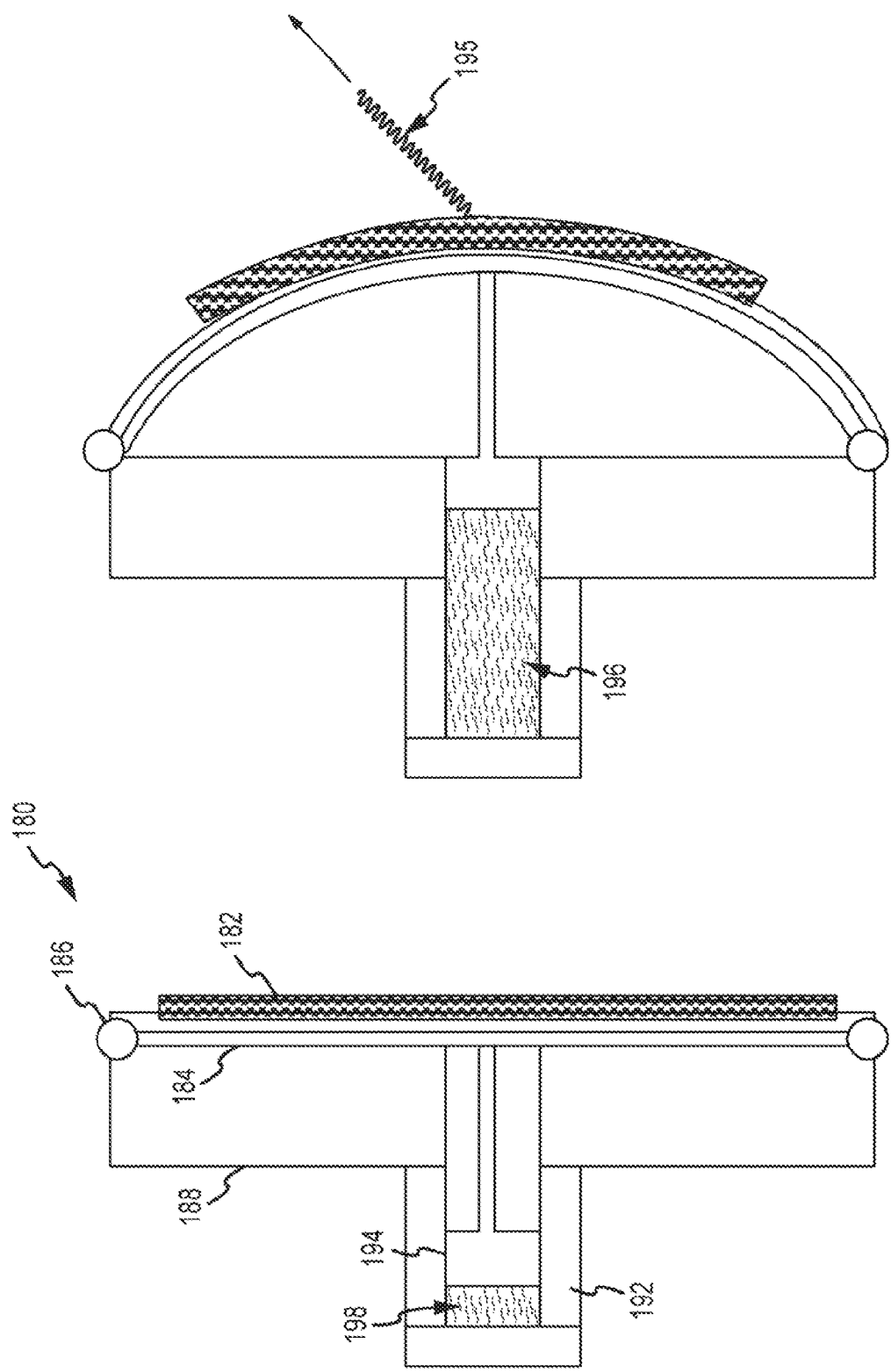
FIGS. 10a and 10b are an embodiment of a bimetallic strip for extracting mechanical work from the cyclic heating and cooling of the crystal to drive a "piston"

FIGS. 10a and 10b illustrate an embodiment for extracting mechanical work from a photonic crystal heat engine 180 from the cyclic heating of the photonic crystal 182. A bi-metallic strip 184 is attached by pins 186 to an object 188 that generates waste heat. Photonic crystal 182 is supported on strip 184. A gas-containing cylinder 192 is formed on the backside and through object 188 with a piston 194 attached to the bi-metallic strip. As described previously, the object will transfer waste heat through the strip to the photonic crystal. When the temperature of the strip exceeds a threshold it will "pop" outwards to a different state as shown in FIG. 10b. This stretches the photonic crystal shifting the emission band towards the peak of the Planck emission at the higher temperature causing the crystal to radiate energy 195. When the strip temperature falls below a second threshold it will pop back to its original state. This process will continue to cycle as waste heat is transferred from the object to the crystal. The cycling of the bi-metallic strip pulls piston 194 out in an expansion gas cycle 196 and then drives the piston inwards in a compression gas cycle 198 producing work. Alternately, the strip may be configured to expand and contract along a continuum with changes in temperature.

Figure 11:
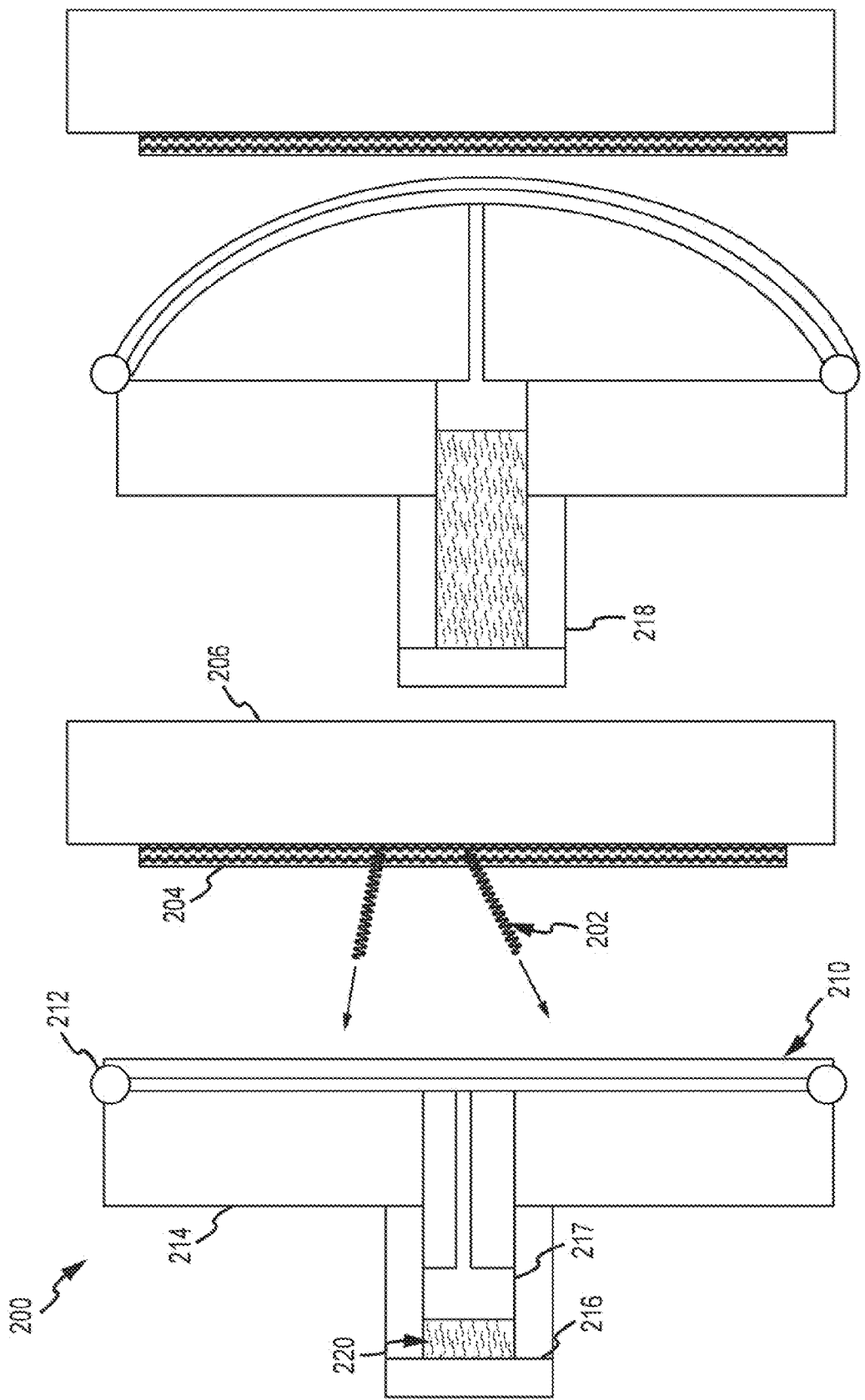
FIGS. 11a and 11b are an embodiment of a bimetallic strip for extracting mechanical work from the cyclic radiation emitted from the crystal to drive a "piston"

FIGS. 11a and 11b illustrate an embodiment for extracting mechanical work from a photonic crystal heat engine 200 from the cyclic radiation 202 of the photonic crystal 204. In this particular embodiment, photonic crystal 204 is supported directly on object 206 that generates the waste heat. The cyclic heating and radiation of photonic crystal 204 will be similar to that shown in FIG. 9. Note, a bi-metallic strip could be inserted between the object and the crystal to actively cycle both the position of the crystal and its emission band to increase the efficiency of radiation. To extract work, a bi-metallic strip 210 is attached by pins 212 to a platform 214. A gas-containing cylinder 216 is formed on the backside and through platform 214 with a piston 217 attached to the bi-metallic strip. Object 206 transfers waste heat to photonic crystal 204 causing it to cyclically emit radiation 202 that heats bi-metallic strip 210. When the strip temperature exceeds a first threshold the strip pops outwards to a different state as shown in FIG. 11b. The radiation from the crystal cycles lower allowing the temperature of the strip to fall. When the temperature drops below a second threshold the strip returns to its original state. This process will continue to cycle as waste heat is transferred from the object to the crystal. The cycling of the bi-metallic strip pulls piston 217 out in an expansion gas cycle 218 and then drives the piston inwards in a compression gas cycle 220 producing work. Alternately, the strip may be configured to expand and contract along a continuum with changes in temperature.

As described previously, heat energy may be transferred from the heat source or object to the photonic crystal via conduction, radiation or convection. Conduction occurs when the photonic crystal is in contact with the heat source or object either directly or through another component such as a bi-metallic strip. Heat may be transferred using radiation by, for example, forming an absorbing layer on the photonic crystal that efficiently absorbs heat energy radiated from the hot region or object. Heat may be transferred using convection by forcing a hot fluid through or near the photonic crystal.

As shown in FIG. 12, a forced fluid system 230 circulates a fluid 232 to transfer heat from a heat source 234 to a photonic crystal 236 that radiates electromagnetic energy 238 to a hear sink 240 such as the sky. Photonic crystal 236 includes cavities 242 and defect cavities 244 in a medium 246. The medium and cavities have a refractive index contrast, which in part determines the PBG and emission band. One of the medium or cavities/defect cavities constitutes void space e.g. open cavities formed in a solid medium or rod-like cavities formed in a void medium. The fluid must have a low refractive index (e.g. a gas) similar to void space to maintain the refractive index contrast and the photonic crystal properties. A pump 248 forces fluid 232 to flow through the void spaces transferring heat from the fluid to the photonic crystal. The fluid returns to heat source 234 to draw additional heat and cycles in a closed system. The temperature of the beat source will fall as heat is removed until either the system reaches a natural equilibrium where leakage through the insulator 250 is offset by emission from the photonic crystal or reaches a set-point temperature at which point circulation is suspended. If the temperature increases, circulation is restarted. As the temperature of the heat source is reduced, an external field may be applied to the defect cavities so that the emission band tracks the Planck peak. Valves 252 may also be manipulated so that the fluid can be at rest for any period required for operating the system in reverse.

Figure 13:
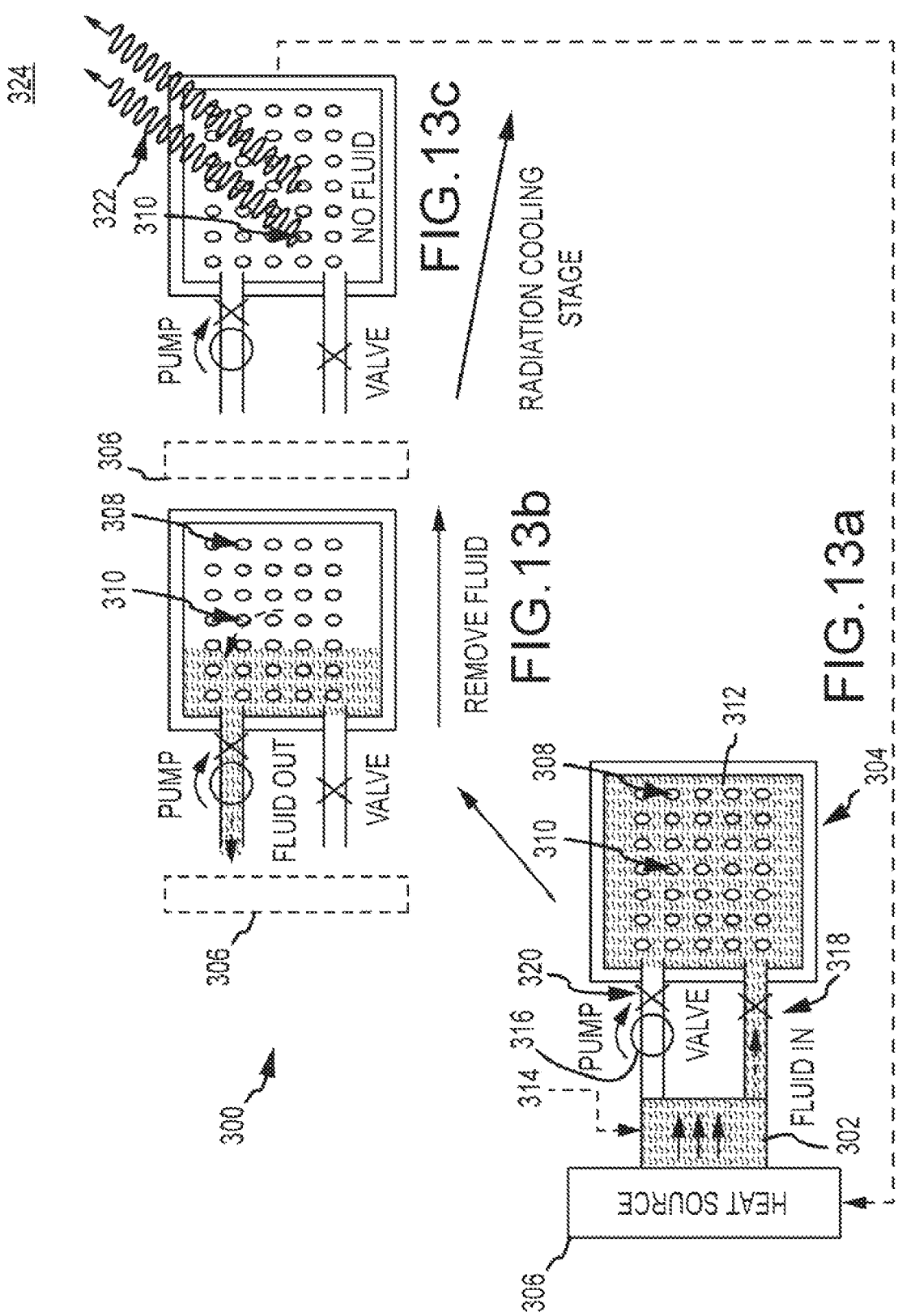
FIGS. 13a through 13c are diagrams of a forced fluid system for cycling the transfer of heat to a photonic crystal and modulating the refractive index contrast to construct and destruct the photonic crystal properties.

As shown in FIGS. 13a-13c, a forced fluid system 300 cycles a fluid 302 into and out of a photonic crystal 304 to transfer heat from a heat source 306 to the photonic crystal and to alternately destruct and then construct the photonic crystal properties by modulating the refractive index contrast. Photonic crystal 304 includes cavities 308 and defect cavities 310 in a medium 312. The medium and cavities have a refractive index contrast, which in part determines the PBG and emission band. One of the medium or cavities/defect cavities constitutes void space e.g. open cavities formed in a solid medium or rod-like cavities formed in a void medium. The fluid must have a high refractive index similar to the non-void space so that when introduced the refractive index contrast is reduced to a point that destroys the photonic crystal properties.

Fluid 302 is stored in a reservoir 314 adjacent heat source 306 to collect heat. A pump 316 and valves 318 and 320 control circulation of the fluid into and out of the crystal. As shown in FIG. 13a, valve 320 is closed and valve 318 opened so that pump 316 can pump fluid 302 from the reservoir into the photonic crystal thereby collecting heat in the crystal. Because the index of the fluid is close to the index of the non-void space, the medium 312 in this configuration, the refractive index modulation is small and the photonic crystal properties are destroyed (i.e. energy is not coupled to the defect cavities to radiate in the emission band over the increased surface area). Once heat has been collected, valve 320 is opened and valve 318 closed so that pump 316 can pump fluid 302 out of the photonic crystal back into the reservoir as shown in FIG. 13b. Once drained, the refractive index contrast is restored and the photonic crystal radiates electromagnetic energy 322 to a heat sink 324 such as the sky. The defect cavities are configured so that the emission band is at or close to the Planck peak. An external field may be applied to track the Planck peaks for shifts in temperature.

Figure 14:
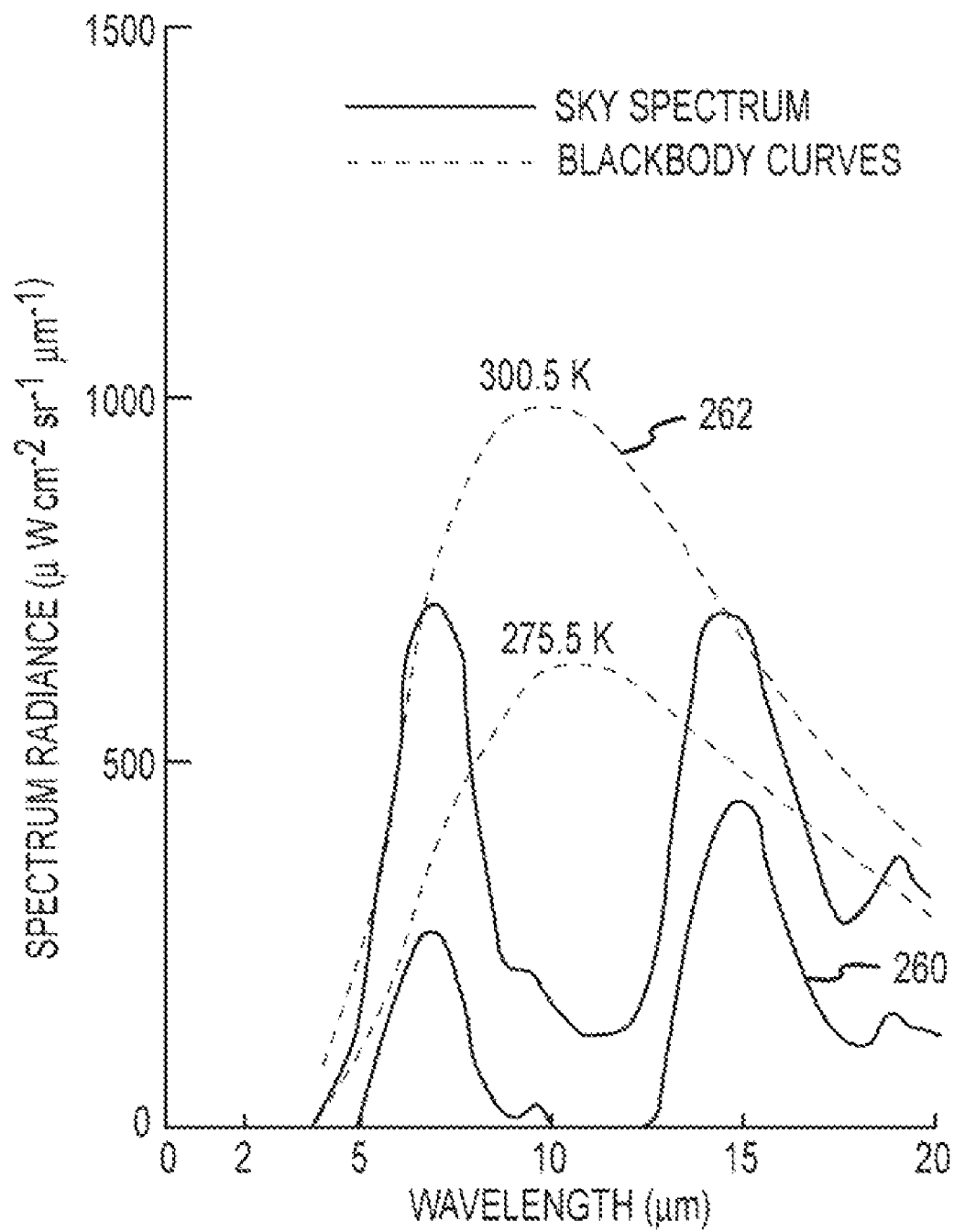
FIG. 14 is a diagram illustrating the use of an atmospheric window to the sky as a cold sink for increasing efficiency of the thermodynamic cycle.

FIG. 14 is a diagram illustrating the desirable properties of using the "cold sky" band near 10 microns as the heat sink for either a heat engine or heat pump (refrigerator) configuration. The sky appears very cold in a narrowband around 10 microns (8-12 microns) e.g. the spectral radiance 260 of the sky is very low as compared to the peak spectral radiance 262 of the Planck emission at the same temperature. This is due to the absence of absorbing or scattering molecules in the atmosphere in that band. The sky thus appears at the temperature of outer space rather than the intervening air temperature. If the system can be configured so that the photonic crystal's emission band lies near 10 microns (between approximately 8-12 microns) when the crystal is radiating the efficiency can be increases markedly. The peak of the Planck emission spectrum for temperatures between 270 K and 330 K lies within this band.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

We claim:

1. A heat transfer device, comprising:
a photonic crystal comprising a periodic arrangement of first and second materials having different refractive indices that create a photonic band gap, said photonic crystal including at least one resonant defect cavity in the periodic arrangement that radiates electromagnetic energy in an emission band within the photonic band gap, said photonic crystal thermally coupled to a cold region to receive thermal energy from the cold region;
an actuator that cyclically performs mechanical work on the photonic crystal by cyclically separating the photonic crystal from the cold region to cycle the photonic crystal between a first state to collect thermal energy from the cold region to heat the crystal and a second state to radiate electromagnetic energy to a hot region to cool the photonic crystal; and
a mechanism that applies an external field to the photonic crystal to cycle the emission band between a first wavelength of relatively low radiance in the first state to collect thermal energy from the cold region and a second wavelength of relatively high radiance in the second state to radiate electromagnetic energy to the hot region.

2. The heat transfer device of claim 1, further comprising:
a plurality of said resonant defect cavities, and
a waveguide for collecting electromagnetic energy from the plurality of resonant defect cavities to a specified location.

3. The heat transfer device of claim 1, wherein the heat transfer device is a refrigerator in which said actuator and said mechanism cycle the photonic crystal between the first and second states to maintain the temperature of the cold region at approximately a cold set-point temperature.

4. The heat transfer device of claim 1, wherein the heat transfer device is a heat pump in which said actuator and said mechanism cycle the photonic crystal between the first and second states to maintain the temperature of the hot region at approximately a hot set-point temperature.

5. The heat transfer device of claim 1, wherein the hot region is Earth atmosphere, said emission band positioned between approximately 8-12 microns in the second state to radiate thermal energy to space through the Earth's atmosphere.

6. The heat transfer device of claim 1, wherein said actuator cyclically separates the photonic crystal from the cold region by physically moving the entire photonic crystal between a first position in the first state that is relatively close to the cold region to collect thermal energy and a second position in the second state that is relatively far from the cold region to radiate electromagnetic energy.

7. The heat transfer device of claim 1, wherein said means actuator cyclically separates the photonic crystal from the cold region by circulating a fluid through the photonic crystal to transfer heat from the cold region into the photonic crystal.

8. The heat transfer device of claim 1, wherein said actuator cyclically separates the photonic crystal from the cold region by pumping a fluid into the photonic crystal to transfer heat from the cold region to the crystal and to destroy the photonic crystal properties and out of the photonic crystal to restore the photonic crystal properties to radiate electromagnetic energy.

9. The heat transfer device of claim 1, wherein said mechanism controls the applied field to shift the first wavelength to maintain low radiance as the photonic crystal collects thermal energy and heats.

10. The heat transfer device of claim 1, wherein said mechanism controls the applied external field to shift the second wavelength to maintain high radiance as the photonic crystal radiates electromagnetic energy and cools.

11. The heat transfer device of claim 1, wherein said mechanism shifts the emission band by applying the external field to the photonic crystal to change at least one of the crystal's lattice constants, symmetry or refractive index contrast.

12. The heat transfer device of claim 1, further comprising a thermocouple on the photonic crystal to measure a temperature of the photonic crystal, wherein said mechanism controls the applied field to shift the second wavelength to track a peak of a Planck emission for the photonic crystal at the measured temperature to maintain high radiance as the photonic crystal radiates electromagnetic energy and cools.

13. A heat transfer device, comprising: a photonic crystal comprising a periodic arrangement of first and second materials having different refractive indices that create a photonic band gap, said photonic crystal including at least one resonant defect cavity in the periodic arrangement that radiates electromagnetic energy in an emission band within the photonic band gap, said photonic crystal thermally coupled to a cold region to receive thermal energy from the cold region; and an actuator that cyclically performs mechanical work on the photonic crystal by cyclically separating the photonic crystal from the cold region to cycle the photonic crystal between a first state to collect thermal energy from the cold region to heat the crystal and a second state to radiate electromagnetic energy to a hot region to cool the photonic crystal.

14. The heat transfer device of claim 13, further comprising:
a mechanism that applies an external field to the photonic crystal to'cycle the emission band between a first wavelength of relatively low radiance in the first state to collect thermal energy from the cold region and a second wavelength of relatively high radiance in the second state to radiate electromagnetic energy to the hot region.

15. The heat transfer device of claim 13, wherein said actuator moves the photonic crystal between a first position in the first state that is relatively close to the cold region to collect thermal energy and a second position in the second state that is relatively far from the cold region to radiate electromagnetic energy.

* * * * *